(12) United States Patent
Thoms

(10) Patent No.: US 8,356,811 B2
(45) Date of Patent: Jan. 22, 2013

(54) STORAGE FILM FEED

(76) Inventor: Michael Thoms, Bietigheim-Bissingen (DE)

( * ) Notice: Subject to any disclaimer, the term of this patent is extended or adjusted under 35 U.S.C. 154(b) by 0 days.

(21) Appl. No.: 12/880,262

(22) Filed: Sep. 13, 2010

(65) Prior Publication Data

US 2011/0079954 A1  Apr. 7, 2011

Related U.S. Application Data

(63) Continuation of application No. PCT/EP2009/052790, filed on Mar. 10, 2009.

(30) Foreign Application Priority Data

Mar. 12, 2008  (DE) .......................... 10 2008 013 918

(51) Int. Cl.
*B65H 5/00* (2006.01)

(52) U.S. Cl. ........ 271/145; 378/182; 378/184; 250/589; 250/584

(58) Field of Classification Search .............. 271/1, 145, 271/162; 206/455; 378/182, 184, 187; 250/589
See application file for complete search history.

(56) References Cited

U.S. PATENT DOCUMENTS

| | | | |
|---|---|---|---|
| 4,889,989 A * | 12/1989 | Yoshimura et al. | 250/589 |
| 5,315,632 A * | 5/1994 | Flynn et al. | 378/167 |
| 5,712,486 A * | 1/1998 | Soltani et al. | 250/484.4 |
| 6,046,458 A | 4/2000 | Rantanen | |
| 6,255,667 B1 | 7/2001 | Rantanen | |
| 6,599,014 B2 | 7/2003 | Thoms | |
| 6,982,411 B2 | 1/2006 | Thoms | |
| 7,315,040 B2 * | 1/2008 | Auer et al. | 250/589 |
| 7,456,419 B2 * | 11/2008 | Wendlandt et al. | 250/589 |
| 7,722,025 B2 * | 5/2010 | Giacometto et al. | 271/3.15 |
| 2006/0091336 A1 | 5/2006 | Muller et al. | |
| 2008/0042083 A1 * | 2/2008 | Wendlandt et al. | 250/589 |

FOREIGN PATENT DOCUMENTS

| | | |
|---|---|---|
| DE | 19942211 A1 | 4/2001 |
| DE | 10303001 A1 | 8/2004 |
| JP | 58004135 A | 1/1983 |
| JP | 04073734 A | 3/1992 |
| JP | 2003015240 A | 1/2003 |
| JP | 2006091126 A | 4/2006 |
| JP | 2006195072 A | 7/2006 |

* cited by examiner

*Primary Examiner* — Luis A Gonzalez
(74) *Attorney, Agent, or Firm* — Laurence A. Greenberg; Werner H. Stemer; Ralph E. Locher

(57) ABSTRACT

A storage film feed feeds a storage film from a flexible sleeve open on one side at a rear side in a storage film detection device. The storage film feed has a feed opening with a penetration gap for the storage film and a slide located in the feed opening for fixing the sleeve. The slide is disposed perpendicular to a flat side of the sleeve. The storage film feed further has a stopping member for the slide, the flat side of the sleeve rests against the stopping member when the slide is actuated.

25 Claims, 6 Drawing Sheets

STORAGE FILM FEED

CROSS-REFERENCE TO RELATED APPLICATION

This is a continuation application, under 35 U.S.C. §120, of copending international application No. PCT/EP2009/052790, filed Mar. 10, 2009, which designated the United States; this application also claims the priority, under 35 U.S.C. §119, of German patent application No. DE 10 2008 013 918.1, filed Mar. 12, 2008; the prior applications are herewith incorporated by reference in their entirety.

BACKGROUND OF THE INVENTION

Field of the Invention

The present invention relates to a storage film feed for feeding a storage film from a flexible sleeve open on one side on an end face into a storage film scanner, referred to briefly as a drum scanner, for example as disclosed by German patent DE 199 42 211 (corresponding to U.S. Pat. Nos. 6,982,411 and 6,599,014), and also relates to a storage film scanner provided with such a storage film feed.

Such storage film scanners are used in the field of dentistry for scanning intraoral storage films with a format between 24×30 mm and 56×75 mm post irradiation by X-rays in the oral cavity of the patient and for scanning extraoral storage films with a format between 127×300 mm and 240×300 mm. In medicine, the storage film dimensions are even as large as 350×430 mm, and in the field of non-destructive material testing they can be as large as 100×400 mm. Since the storage films post X-ray irradiation lose the information stored if they are subjected to light, they have to be surrounded at least on the functional side by opaque sleeves (light-protection sleeves) or cassettes until the information is scanned in the storage film scanner. In order to prevent the sleeve from being drawn into the storage film scanner together with the storage film, e.g. German patent DE 199 42 211 proposes for the respective film format using special specific feed arrangements in the form of cassettes, from which the storage film can be advanced into the storage film scanner. As an alternative to this, the prior art has disclosed providing flexible light-protection sleeves with interlocking elements such that these sleeves latch onto the feeder region of the storage film scanner and cannot be drawn in. Furthermore, it is expedient for the cassettes and flexible light-protection sleeves to be thickened at the passage gap of the storage film scanner such that the latter is screened from the surrounding light. The disadvantage of the first solution consists of the fact that significantly more handling complexity is generated because the storage film first of all has to be pushed into the insertion aid from the sleeve, the insertion aid with the storage film thereafter has to be latched onto the feeder region of the storage film scanner and the storage film must subsequently be pushed into the storage film scanner with a lever on the insertion aid. The disadvantage of the second solution consists of the fact that the flexible light-protection sleeve provided with interlocking elements no longer readily fits into conventional X-ray cassettes.

SUMMARY OF THE INVENTION

It is accordingly an object of the invention to provide a storage film feed which overcome the above-mentioned disadvantages of the prior art devices of this general type, which feeds the storage film without aids such as cassettes from simple sleeves not necessarily provided with interlocking elements into a storage film scanner under external-light protection and to reduce the number of handling steps significantly. Furthermore, the storage film should be spanned automatically in a cylindrical fashion in the case of a cylindrical scanner arrangement as in German patent DE 199 42 211 and so the corresponding handling complexity is dispensed with.

With the foregoing and other objects in view there is provided, in accordance with the invention a storage film feed for feeding a storage film from a flexible sleeve open on one side on an end face into a storage film scanner. The storage film feed contains a feed opening with a passage gap formed therein for the storage of film, a slide operating perpendicular to a flat side of the flexible sleeve, and a stop piece associated with the slide. The stop piece and the slide are disposed for fixing the flexible sleeve in the feed opening against the stop piece. The flexible sleeve bears with the flat side thereof when the slide is actuated.

In accordance with an added feature, the coefficients of static friction of the storage film in the flexible sleeve are less than coefficients of static friction of the flexible sleeve with respect to the stop piece and the slide.

In accordance with an additional feature, an elastic compression piece is disposed on one of the stop piece and on the end face of the slide facing the stop piece. The compression piece is simultaneously provided for covering of the passage gap in an opaque fashion. The compression piece completely covers the passage gap in an initial position.

In accordance with a further feature, the slide has a bearing face disposed such that it can pivot about an axis oriented parallel to the bearing face.

In accordance with another further feature, the compression piece and the stop piece respectively have a friction coating on associated storage film sides. The friction coating increases a coefficient of static friction of the flexible sleeve with respect to the slide and the stop piece.

In accordance with another added feature, suction air channels are disposed in the stop piece, the slide and/or the compression piece, in each case on a side of the flexible sleeve.

In accordance with an added feature of the invention, an interlocking connection is provided between the flexible sleeve and the stop piece or the slide. The interlocking connection prevents the flexible sleeve from being pulled through the passage gap when the slide is closed. The interlocking connection is formed by a web attached to the flexible sleeve and a recess formed in the slide or the stop piece.

In accordance with a further feature, a light-protection element covers the passage gap and pivots away from the passage gap when the storage film is inserted.

In accordance with yet another feature, a sensor is installed in the stop piece and/or the slide for detecting the storage film situated in the flexible sleeve bearing against the bearing face.

In accordance with an additional feature, a sensor is provided on an inside of the stop piece or the slide for detecting whether the storage film has completely passed through the passage gap.

In accordance with another embodiment, a drive is provided for pressing the slide against the sleeve when the storage film in the flexible sleeve bears against a bearing face of the slide and retracts the slide when the storage film has completely passed through the passage gap.

In accordance with a further embodiment, an additional slide is provided that can be moved in a direction of the feed opening and by use of the additional slide the storage film can be inserted into the storage film scanner from the flexible sleeve. Ideally, the additional slide has a planar underside.

In accordance with an added embodiment, a motor drive is provided. The additional slide pushes the storage film into the passage gap via the motor drive after the slide bears against the stop piece. The additional slide is returned to an initial position by the motor drive when the storage film is gripped by a feeder of the storage film scanner.

In accordance with yet another embodiment, the slide and the stop piece are connected to a housing of the storage film scanner in an opaque fashion.

In accordance with a feature of the invention, the stop piece has guide elements for the slide.

In accordance with another additional feature, a lateral bearing element is provided for guiding the sleeve laterally, the lateral bearing element is attached to the stop piece or the housing. The lateral bearing element can be positioned at different positions for different storage film and feed widths.

In accordance with another feature, the stop piece and the slide have stop faces with a curved geometry perpendicular to a feed direction such that the storage film assumes a same curvature when the slide is closed.

In accordance with a concomitant feature of the invention, the passage gap has inner faces with a soft low-friction coating. Ideally, the passage gap has a clear width being greater than a thickness of the storage film and the inner faces have a minimum clearance of 0.3 mm from the storage film when the storage film is inserted.

With the foregoing and other objects in view there is provided, in accordance with the invention a storage film assembly. The storage film assembly contains a sleeve for use in a storage film scanner and a storage film disposed in the sleeve.

In accordance with an added feature, the storage film has at least one low-wear covering layer. The low-wear covering layer has a greater surface hardness than a material on corresponding inner faces of the sleeve.

In accordance with an additional feature, the storage film has a low-wear labeling compared to the sleeve. The low-wear labeling has a greater surface hardness than the material on the corresponding inner faces of the sleeve.

Other features which are considered as characteristic for the invention are set forth in the appended claims.

Although the invention is illustrated and described herein as embodied in a storage film feed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
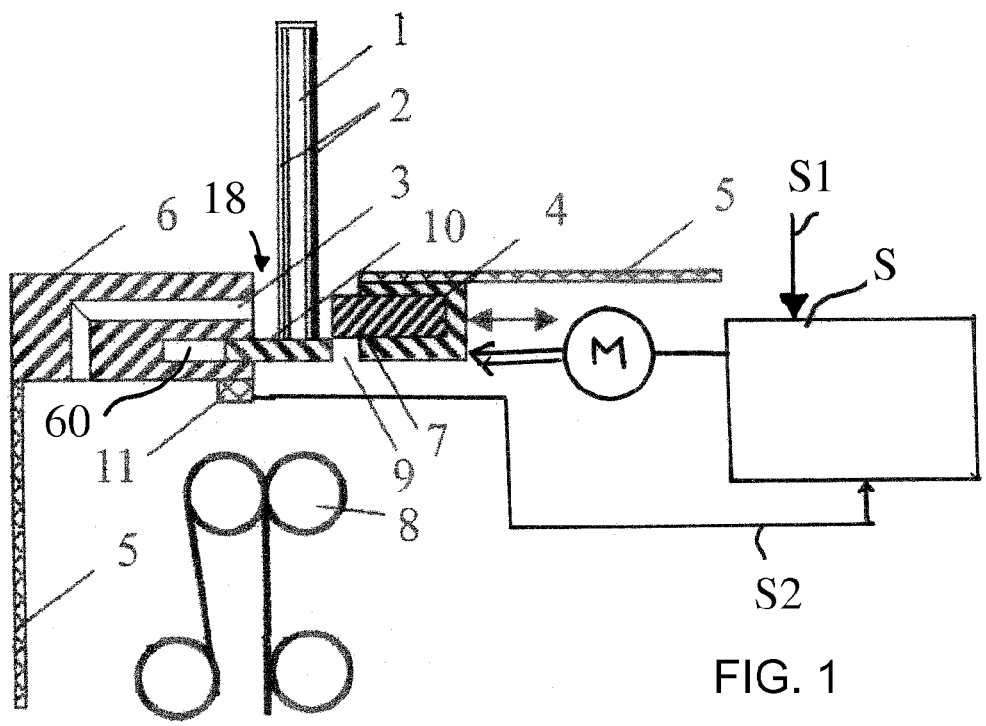
FIG. 1 is a diagrammatic, sectional view through a storage film feed according to the invention after attaching a storage film in a sleeve.

Referring now to the figures of the drawing in detail and first, particularly, to FIG. 1 thereof, there is shown a section through a storage film feed according to the invention. It is attached to a housing 5 of a storage film scanner and contains a slide 4, which, below a feed opening 18 of the storage film feed, can be moved to and fro by a drive M relative to a stop piece 6 fixed on the housing 5 in accordance with the direction of the arrow. For this, use can be made of e.g. a motor-driven driving rod, a motor-driven shaft or a lifting magnet. For reasons of clarity, these elements are only indicated schematically in FIG. 1. The slide 4 is guided either on the housing 5 or on the stop piece 6. The underside of the slide 4 forms a planar bearing face 10, onto which a flexible sleeve 2 open on one side on an end face and equipped with a storage film 1 can easily be placed manually from above with its open, likewise planar end face. This aligns the sleeve 2 and hence the storage film 1 in a vertical fashion. The bearing face 10 is configured such that it immerses into the stop piece 6 and is also guided in the latter in a linear fashion. In the example, a groove 60 is arranged in the stop piece 6 as a guide element for the slide 4 and a web of the slide 4 forming the bearing face 10 is guided therein. There is a passage gap 9 in the lower part of the slide 4, the width of which is slightly greater than the thickness of the storage film 1. The gap 9 forms a passage opening for the storage film 1 into the interior of the housing 5, where it is gripped by a feeder 8 for onward transport.

The inner faces of the passage gap 9 are provided with a soft low-friction coating or layer, such as PTFE (Teflon) or LDPE (low density polyethylene) in order to reduce possible friction between the scratch-sensitive front flat side of the storage film 1, i.e. the side facing the X-ray source during irradiation, and the slide 4 in the case of a malfunction. On the end face of the slide 4 facing the storage film 1 or the stop piece 6, there is arranged a compression piece 7, made of e.g. soft rubber foam, which covers the passage gap 9. Suction air channels 3 can be arranged opposite thereto in the stop piece 6, which suction air channels have the function of holding the sleeve 2 when the slide 4 presses against the stop piece 6. Since it is inexpedient for surrounding light to fall into the storage film scanner, it is important for the connections between the parts of the storage film feed, i.e. between the slide 4 and the stop piece 6 and the housing 5, to be configured as gap free and opaque as possible so that no light falls into the interior of the scanner. It may be necessary in this case to suppress incident light by tongue and groove elements on the connection surfaces and by black color on the abutting edges.

In order to enable detection of whether a storage film 1 has been placed onto the bearing face 10 in the feed opening 18, a sensor, e.g. a reflection photoelectric sensor, is installed into the slide 4 or the stop piece 6. According to the invention, it is also possible for a photodiode 17 (FIG. 7) and a light-emitting diode 16 (FIG. 7) situated opposite one another in these two parts to form a fork-type photoelectric sensor for recognizing the storage film.

If a storage film 1 situated in a sleeve 2 open on one end face is now placed onto the bearing face 10 in the feed opening 18 with this open end face, the sensor sends a signal S1 to a control unit S, which moves the slide 4, either immediately or with a short delay, to the left (closing direction) and perpendicular to a flat side of the sleeve 2 with the aid of the drive M. As an alternative, the signal S1 can be generated by a pushbutton 19 (see FIG. 8) on the housing 5. As a result of the leftward movement of the slide 4, the sleeve 2 with the storage film 1 contained therein is pushed to the stop piece 6 until the flat side of the sleeve bears against the stop piece. In the process, the compression piece 7 is compressed and clamps the sleeve 2 from the outside with a certain spring force. When the storage film 1 and its sleeve 2 bear against the stop piece 6, the end face of the storage film is flush with the passage gap 9. What is important is that the static friction between the stop faces of stop piece 6, compression piece 7 and the sleeve 2 is significantly greater than the static friction between the sleeve 2 and the storage film 1 situated therein. In other words: the coefficients of static friction between the storage film 1 and the inner faces of the sleeve 2 are less than the coefficients of static friction between the outer faces of the sleeve 2 and the stop face of the stop piece 6 or the compression piece 7 of the slide 4. For this, the inner face of the sleeve 2 consists of soft low-friction material in order to reduce the wear on the storage film 1. The storage film 1 can additionally be provided with at least one low-wear covering layer, which preferably has a greater surface hardness than the material on the corresponding inner face(s) of the sleeve 2. The storage film 1 can moreover carry labeling, which is low-wear compared to the sleeve 2 and has a greater surface hardness than the material on the corresponding inner face(s) of the sleeve 2.

Both the end face of the compression piece 7 facing the stop piece 6 and the stop face of the stop piece 6 can be coated with a friction coating in order to increase the static friction.

Storage film feed and storage film 1 with sleeve 2 thus form a system in which the individual components—storage film feed, storage film and sleeve—are matched to one another. In practice, it was found when using a sleeve 2 made of LDPE and when coating the compression piece 7 with silicone that the adhesion force of the storage film 1 in the sleeve 2 was approximately 0.4 N and the adhesion force of the sleeve 2 on the compression piece 7 of the slide 4 was approximately 1.1 N in the case of a lateral contact force of 1.6 N caused by the slide. Thus, with a safety factor of almost 3, this ensures that the storage film 1 can be pushed out of the sleeve 2 with the finger, while the sleeve 2 itself remains fixed in the feed opening 18 in the slide 4 or in the compression piece 7.

In order to guide the sleeve 2 and thus the storage film 1 situated therein laterally on its narrow sides running perpendicular to the end face, a lateral bearing element bearing against a narrow side of the sleeve 2 can moreover be arranged on the stop piece 6 or the housing 5. In order to allow various storage film widths and feed widths, the bearing element can moreover be positioned at various positions by means of e.g. a latching connection.

Figure 2:
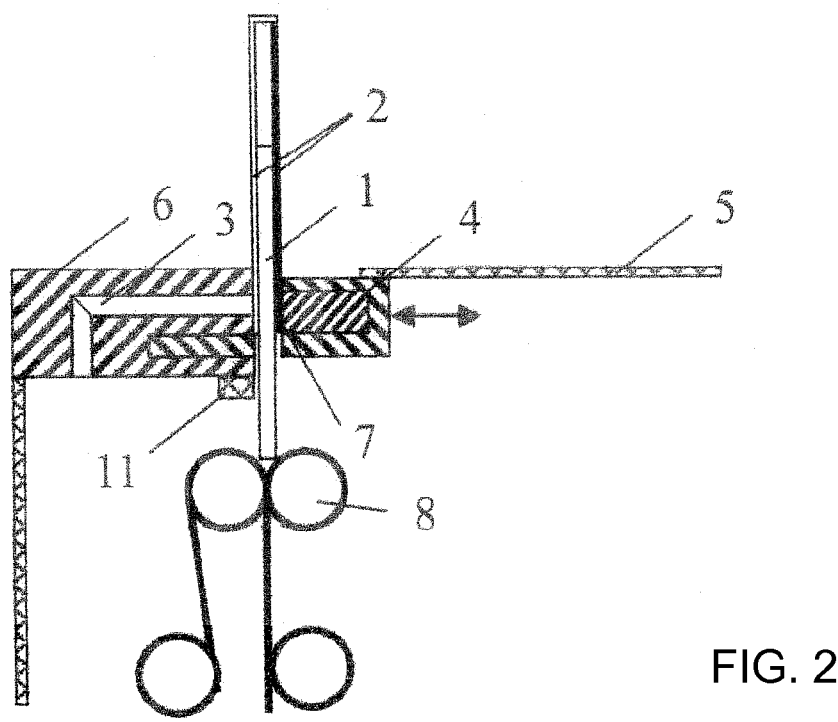
FIG. 2 is a diagrammatic, sectional view through the storage film feed when the storage film is partly extended out of the sleeve.

FIG. 2 shows the state when subsequent pressure on the closed end face of the sleeve 2 facing away from the open end face and hence pressure on the storage film 1 pushes the latter downward through the passage gap 9. This can be brought about e.g. manually or driven by a motor by an additional slide or lever attaching to the top. The storage film 1 meets the feeder 8, e.g. in the form of a band feed, below the passage gap 9. The feed continuously pulls the storage film 1 further downward while the sleeve 2 still remains clamped between the stop piece 6 and the compression piece 7. In the process, the compression piece 7, which consists of opaque material, seals a separation gap remaining between stop piece 6 and slide 4. The spacing between stop piece 6 and slide 4 in this position is slightly greater than the thickness of the storage film 1 including sleeve 2 and so no noteworthy pressure is acted on the sleeve 2 by the slide 4 itself, but only by the compression piece 7.

The clearance of the passage gap 9 is slightly greater than the thickness of the storage film 1 such that the inner faces of the former do not touch the storage film 1 in this position and for example respectively have a minimum clearance of 0.3 mm from the storage film 1.

There is a sensor 11, for example a photoelectric sensor, arranged on the underside of the stop piece 6 facing away from the feed opening 18 and the sensor generates a signal S2 that indicates that the storage film 1 has been pushed through the passage gap 9. The signal S2 of the sensor 11 can be used to start the feeder 8, indicated schematically here in the form of a band feed. The sensor 11 moreover detects when the storage film 1 has left the passage gap 9 again, i.e. completely passed through the latter. The signal S2 generated by the sensor 11 makes the drive M controlled by the control unit S push the slide 4 into the initial position as per FIG. 1 again after a short time delay, and so a further storage film 1 with its sleeve 2 can be applied. Alternatively, the slide 4 can also be opened by the user activating a pushbutton 19 (FIG. 8), which is affixed to the housing 5. The compression piece 7 is used during this process to close off the passage gap 9 again in an opaque fashion. In a further variant, a delay circuit can also be implemented in the control unit S such that the slide 4 is only driven into the initial position after the storage film 1 was completely scanned. This always ensures that no external light can be incident during the scanning procedure due to the movement of the slide 4 and as a result of this the scanned image contains no defects.

Figure 3:
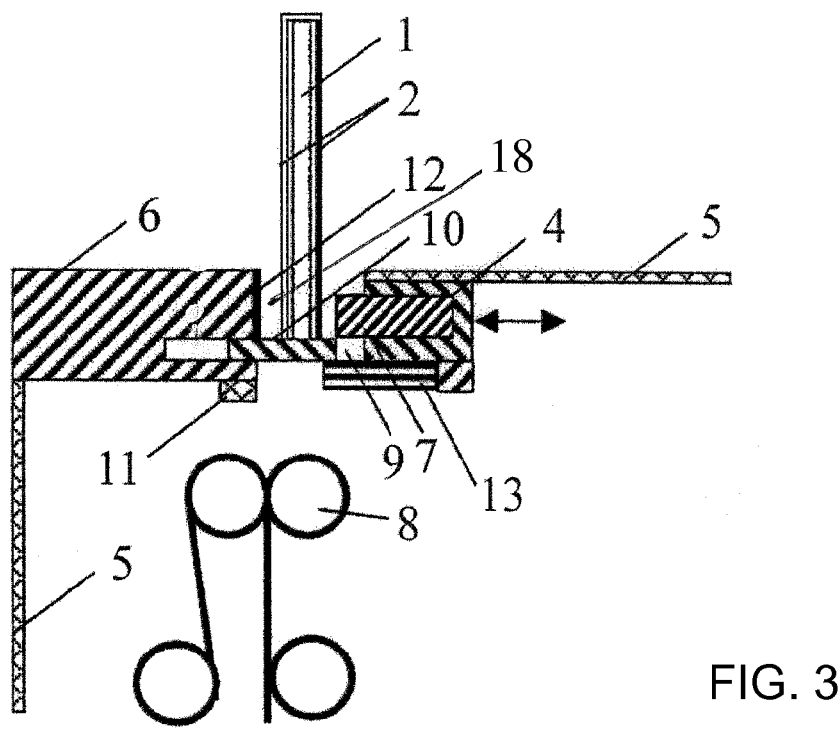
FIG. 3 is a diagrammatic, sectional view illustrating a further embodiment with an integrated friction coating.

FIG. 3 shows the refinement according to the invention in which the stop face of the stop piece 6 is provided with a friction coating 12, e.g. made of silicone rubber. Furthermore, a light-protection element 13, for example a brush, is arranged below the passage gap 9 and covers the passage gap 9, providing additional light protection. When the storage film 1 is inserted, this light-protection element is bent downward and thereby pivoted away from the passage gap 9.

Figure 4:
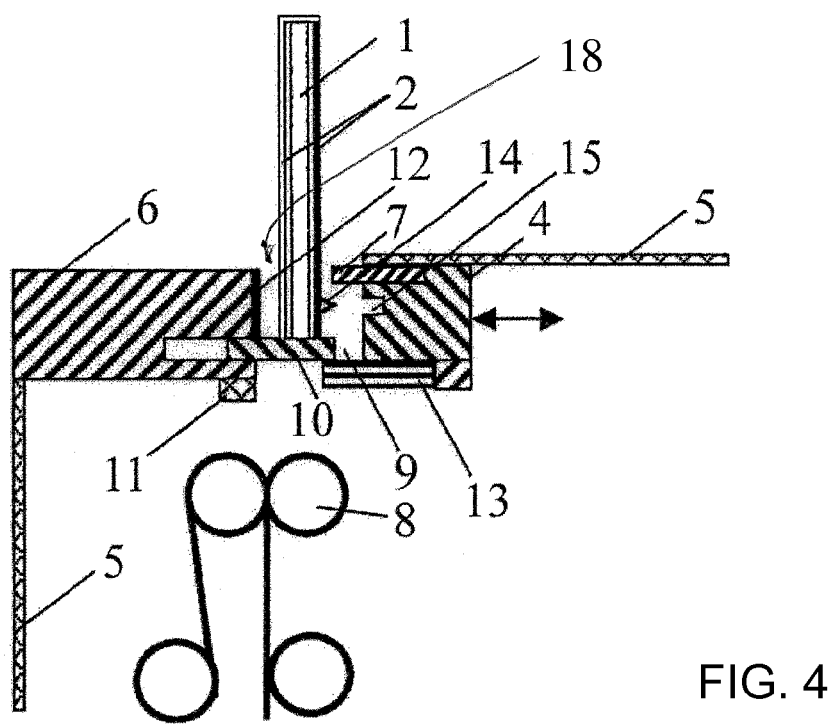
FIG. 4 is a diagrammatic, sectional view showing a further embodiment of the invention with integrated light protection and form fit for holding the sleeve.

A form fit between the sleeve 2 and the feed opening 18 when the slide 1 is closed can be used as an alternative to the friction coating 12, as illustrated in FIG. 4. For this, a narrow wedge-shaped web 14 for example can be affixed to the sleeve 2 as an interlocking connection, which wedge engages into a corresponding recess 15 of the slide 4 when the slide 4 is actuated in the closing direction and prevents the sleeve 2 from being pulled through the passage gap 9 when the slide 4 is closed. The opaque compression piece 7 is still attached to the slide 4 for sealing off against surrounding light. In addition or as an alternative thereto, such an interlocking connection 14, 15 can also be provided between sleeve 2 and stop piece 6.

Figure 5:
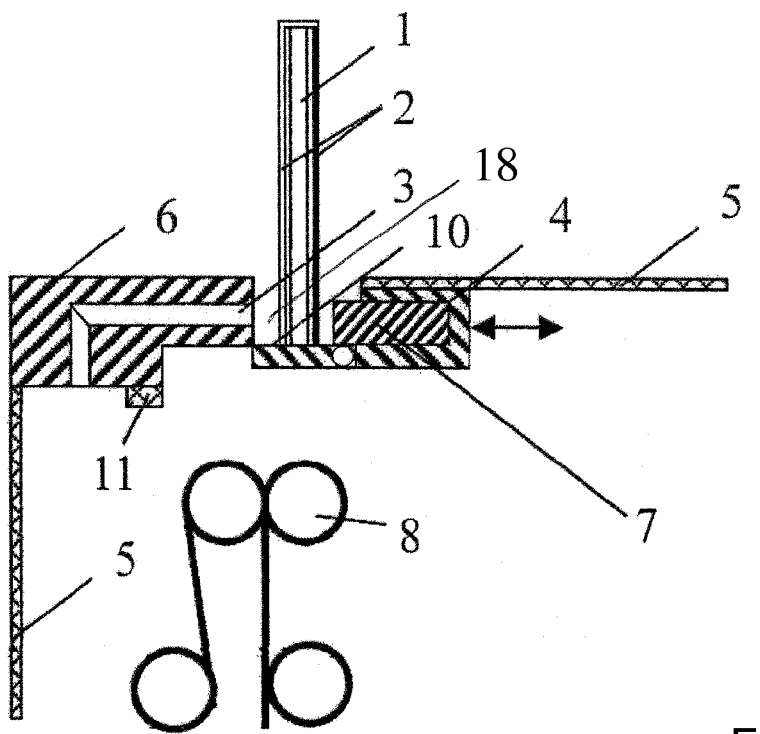
FIG. 5 and FIG. 6 are diagrammatic, sectional views showing a variant of the invention with a partly tilted away bearing face.
Figure 6:
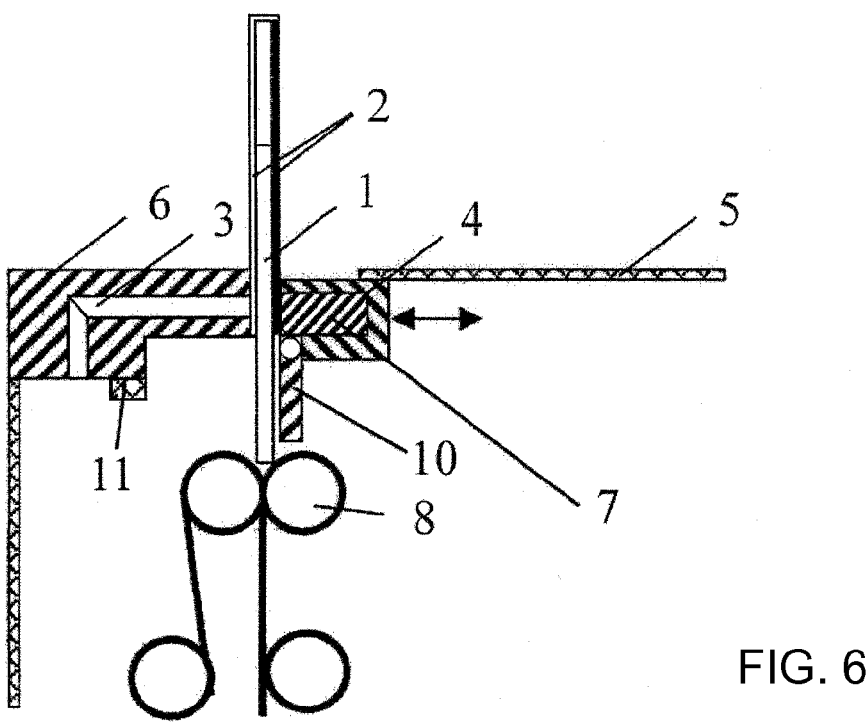

FIGS. 5 and 6 show a variant in which the planar bearing face 10 is arranged, flush with the underside of the stop piece 6 (storage film 1 in initial position, FIG. 5), on the slide 4 with the aid of a hinge and can be pivoted by 90 degrees about an axis oriented parallel to the bearing face 10 of the storage film 1, which corresponds to the position with an extended storage film 1 (FIG. 6).

Figure 7:
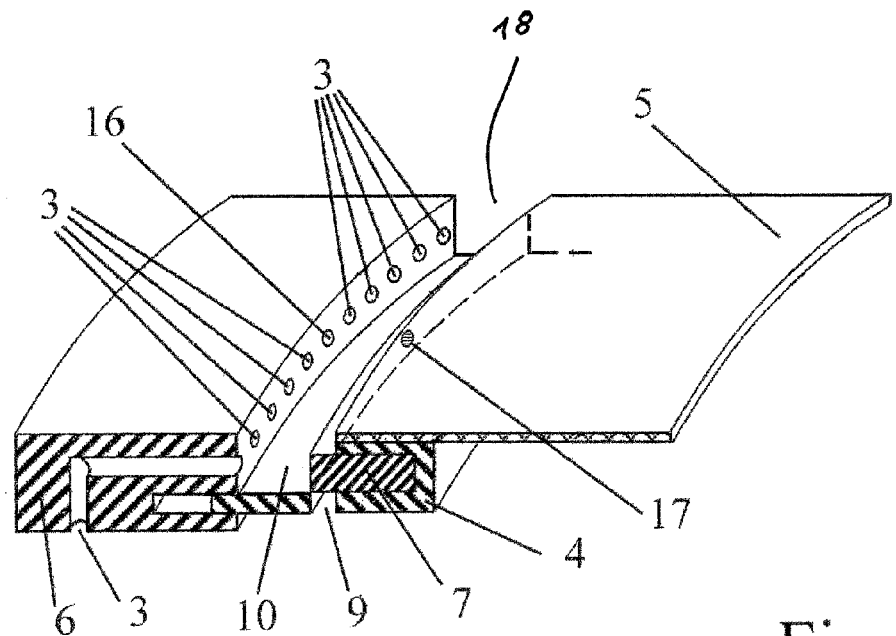
FIG. 7 and FIG. 8 are diagrammatic, perspective views showing two options illustrating the arrangement of the storage film feed according to the invention on the housing of the storage film scanner.

FIG. 7 schematically shows a/the storage film feed according to the invention in a cylindrically curved shape. This embodiment can be used particularly advantageously in conjunction with the scanner described in German patent DE 199 42 211 because the storage film obtains a cylindrical shape as a result of the action of the feed. The central arrangement of light-emitting diode 16 and photodiode 17 relative to the feed opening 18 can be identified. In principle, the feed can bend the storage film into other shapes, e.g. a parabolic or elliptical shape, in the case of an appropriate shape of the slide 4 and stop piece 6.

Figure 8:
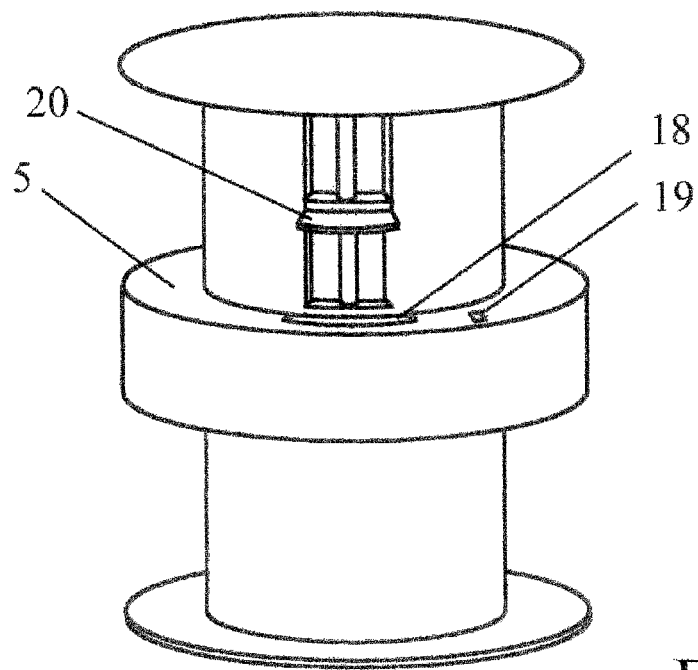

FIG. 8 shows a further perspective view of the storage film feed according to the invention, which can likewise be used in the scanner known from German patent DE 199 42 211. Here, the light-emitting diode and photodiode can also be arranged centrally with respect to the feed opening 18. The advantage of this arrangement consists of the fact that the sleeve 2 equipped with the storage film 1 can be inserted into the feed opening 18 in the simplest fashion, which is a requirement for fully-automated operation. Furthermore, provision can be made for an additional feed slide 20 parallel to the flat side of the inserted storage film 1 or sleeve 2, which feed slide can be actuated in the vertical direction in this example and advances the storage film 1 into the transport region after closing the slide 4, which is horizontal in this example. In the process, the slide 20 engages on the topside, i.e. the end face facing away from the open end face, of the sleeve 2 equipped with the storage film 1. The feed slide 20 is preferably planar on the underside thereof facing the end face of the sleeve 2, and so tilting of the storage film 1 is avoided when the latter is pushed out of the sleeve 2. If the feed slide 20 is displaced by motor, the feeder operates in a fully-automated fashion and handling by the operator is limited to placing the storage film 1 with the sleeve 2 open on one side onto the bearing face 10 of the feed opening. The feed slide 20 then pushes the storage film 1 through the passage gap 9 by a motor drive after the slide 4 bears against the sleeve 2 and clamps the latter. The motor drive again returns the feed slide 20 into the initial position once the storage film 1 has left the passage gap 9. It should be noted here that the feed according to the invention also operates together with solid cassettes whose bottom contour corresponds to the shape of the feed slit 18 and which have an opening on their underside that is flush with the passage gap 9. Furthermore, the feed slide 20 can be used to push the storage film 1 downward out of such a cassette if the cassette has e.g. openings through which the feed slide 20 can act directly on the storage film, or if the cassette has e.g. an additional coupling piece protruding from the cassette and connecting the feed slide 20 with the upper edge of the storage film.

Figure 9:
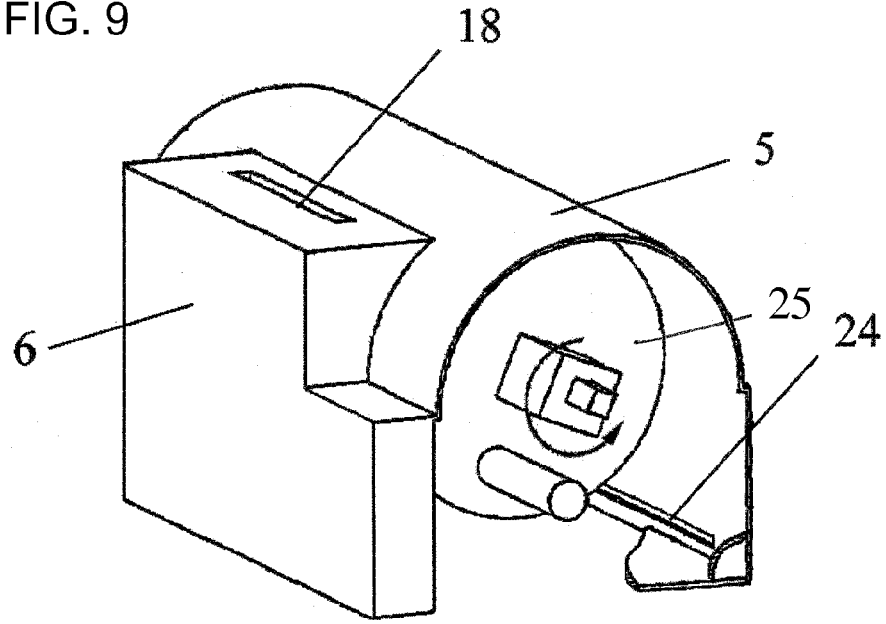
FIG. 9 is a diagrammatic, sectional view showing a tangential feed or ejection of the storage film.
Figure 10:
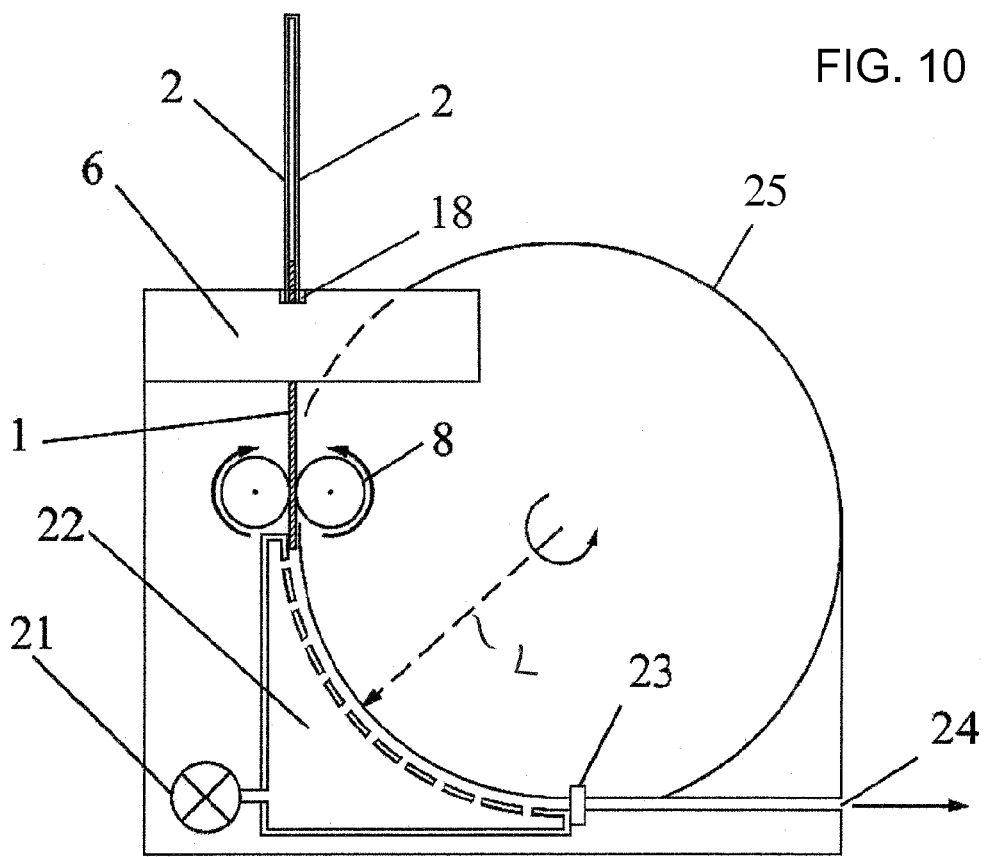
FIG. 10 is a diagrammatic, cross-sectional view of FIG. 9 showing the tangential feed or ejection of the storage film.
Figure 11:
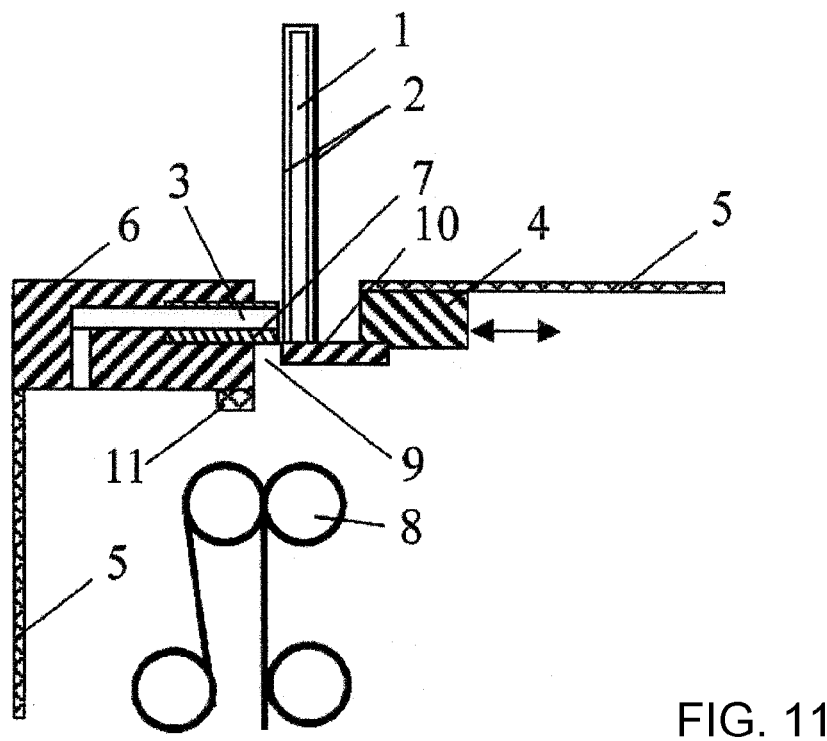
FIG. 11 and FIG. 12 are diagrammatic, sectional views illustrating a further embodiment with a fixed passage gap for the storage film.

In conjunction with a read-out unit, as already described in German patent DE 199 42 211 and depicted therein in FIG. 11, the storage film feed according to the invention can realize a particularly compact storage film scanner, which is illustrated in FIGS. 9 and 10. FIG. 9 exemplifies a storage film scanner, in which the storage film is fed and ejected tangentially to a drum 25 revolving around a rotational axis, in which a laser revolving with the drum 25 is arranged. In this case, the feed opening 18 and the outlet opening 24 have the form of a slit oriented parallel to the rotational axis.

The cross-sectional image according to FIG. 10 shows labeled with 2 the sleeve, in which the storage film 1 is still partly situated, which storage film is currently entering a quarter-circle-shaped slide 22 by a roll drive 8. The slide is provided with perforations so that the storage film 1 has better adhesion thereto, which perforations are activated by actuating a vacuum pump 21 as soon as the storage film 1 has reached a stop 23. Thereupon the storage film 1 is scanned by the planar laser beam L, indicated by the dashed line, under simultaneous forward motion of the slide, for example by a rack and pinion drive (not illustrated). Once this procedure has been completed, the stop 23 releases the storage film 1, the vacuum pump 21 is deactivated and the storage film 1 appears at the outlet opening 24. Additionally, a further driven roll pair (not illustrated) can also be provided if the gravitational force does not suffice to move the storage film 1 sufficiently far out of the outlet gap 24. The same holds true if the slide or the storage film 1 is greater than a quarter-circle.

Figure 12:
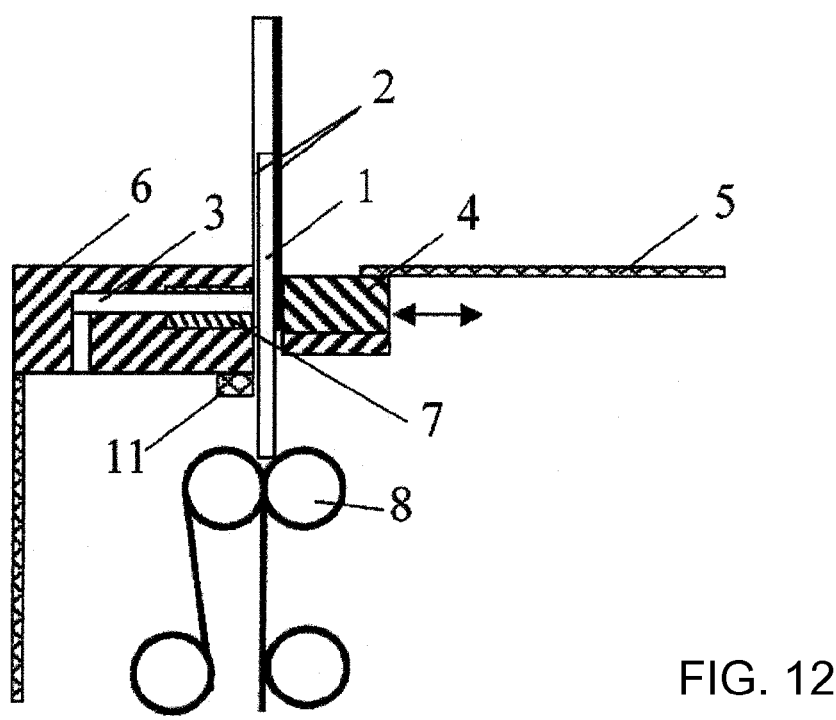

FIG. 11 illustrates a further embodiment of the storage film feed according to the invention. Here, unlike FIG. 1, the compression piece 7 is attached to the stop piece 6 and protrudes over the stop face. Furthermore, the bearing face 10 and the passage gap 9 are fixedly connected to the stop piece 6. The suction air channels 3 penetrate the stop piece 6 and the compression piece 7. In the rest position of the slide 4, the compression piece 7 preferably covers the entire passage gap 9, and so no external light can fall into the scanner. For this, the compression piece 7 can consist of e.g. soft, easily compressible rubber material, which has a high coefficient of static friction with respect to the sleeve 2. However, the compression piece 7 can also be mounted in the stop piece 6 in a displaceable fashion such that it is pushed out of the stop piece 6 in the direction of the slide 4 by a spring. The spring constant of this spring determines the contact force with which the storage film sleeve 2 is clamped and held when the slide 4 is closed. Furthermore, this compression piece mounted in a displaceable fashion (not illustrated) is preferably equipped with stops in the stop piece 6 such that it can at most be pushed that far to the left that the passage gap 9 is completely uncovered and that far to the right that the entire passage gap 9 is covered by the compression piece. Furthermore, the displaceable compression piece (not illustrated) can consist of a plurality of partial segments corresponding to the feed width of different storage film formats. This ensures that the gap 9 is covered in an opaque fashion by segments of the displaceable compression piece even at positions at which there is no sleeve 2. Furthermore, the displaceable compression piece 7 and the slide 4 are preferably provided with a coating with a high coefficient of static friction with respect to the sleeve 2. If the storage film 1 is placed onto the bearing face 10, the slide 4 is then subsequently advanced to the right side of the passage gap 9 such that the sleeve 2 is clamped between the slide 4 and the clamping piece 7 or the stop piece 6. FIG. 12 shows the storage film 1 after it was partly pushed through the passage gap 9.

A further advantage of the feed over an embodiment in which the storage films are fed in cassettes lies in the smaller installation height both because bearing elements for the cassette are dispensed with and because the cassette with its actuation means for pushing out the storage film itself requires more space than the storage film contained therein.

It is furthermore advantageous that, in the case of a central arrangement of the sensor in the feed, the transport is only initiated when the storage film 1 covers the center of the feed gap. Thus, in the case of a band transport located centrally therebelow, this ensures that the storage film is reliably pulled in and transported onward thereby.

The invention claimed is:

1. A storage film feed for feeding a storage film from a flexible sleeve open on one side on an end face into a storage film scanner, the storage film feed comprising:
   a slide operating perpendicular to a flat side of said flexible sleeve; and a stop piece associated with said slide, said stop piece and said slide together defining a feed opening formed therebetween and a passage gap formed therein for the storage film;

wherein said slide has an actuated position in which said slide exerts a compression force that fixes said flexible sleeve in said feed opening and in which said flat side of said flexible sleeve bears against said stop piece.

2. The storage film feed according to claim 1, wherein coefficients of static friction of the storage film in said flexible sleeve are less than coefficients of static friction of said flexible sleeve with respect to said stop piece and said slide.

3. The storage film feed according to claim 1, further comprising an elastic compression piece disposed on one of said stop piece and on said end face of said slide facing said stop piece.

4. The storage film feed according to claim 3, wherein said compression piece is simultaneously provided for covering of said passage gap in an opaque fashion.

5. The storage film feed according to claim 4, wherein said compression piece completely covers said passage gap in an initial position.

6. The storage film feed according to claim 3, wherein said compression piece and said stop piece respectively have a friction coating on associated storage film sides, said friction coating increasing a coefficient of static friction of said flexible sleeve with respect to said slide and said stop piece.

7. The storage film feed according to claim 1, wherein said slide has a bearing face disposed such that it can pivot about an axis oriented parallel to said bearing face.

8. The storage film feed according to claim 7, further comprising a sensor installed in at least one of said stop piece and said slide for detecting the storage film situated in said flexible sleeve bearing against said bearing face.

9. The storage film feed according to claim 1, further comprising suction air channels disposed in at least one of said stop piece, said slide and said compression piece, in each case on a side of said flexible sleeve.

10. The storage film feed according to claim 1, further comprising an interlocking connection between said flexible sleeve and one of said stop piece and said slide, said interlocking connection prevents said flexible sleeve from being pulled through said passage gap when said slide is closed.

11. The storage film feed according to claim 10, wherein said interlocking connection is formed by a web attached to said flexible sleeve and a recess formed in one of said slide and said stop piece.

12. The storage film feed according to claim 1, further comprising a light-protection element covering said passage gap and pivots away from said passage gap when the storage film is inserted.

13. The storage film feed according to claim 1, further comprising a sensor on an inside of at least one of said stop piece and said slide for detecting whether the storage film has completely passed through said passage gap.

14. The storage film feed according to claim 1, further comprising a drive for pressing said slide against said sleeve when the storage film in said flexible sleeve bears against a bearing face of said slide and retracts said slide when the storage film has completely passed through said passage gap.

15. The storage film feed according to claim 1, further comprising an additional slide that can be moved in a direction of said feed opening and by means of said additional slide the storage film can be inserted into the storage film scanner from said flexible sleeve.

16. The storage film feed according to claim 15, wherein said additional slide has a planar underside.

17. The storage film feed according to claim 15, further comprising a motor drive, said additional slide pushes the storage film into said passage gap by means of said motor drive after said slide bears against said stop piece.

18. The storage film feed according to claim 17, wherein said additional slide is returned to an initial position by said motor drive when the storage film is gripped by a feeder of the storage film scanner.

19. The storage film feed according to claim 1, wherein said slide and said stop piece are connected to a housing of the storage film scanner in an opaque fashion.

20. The storage film feed according to claim 1, wherein said stop piece has guide elements for said slide.

21. The storage film feed according to claim 1, wherein said stop piece and said slide have stop faces with a curved geometry perpendicular to a feed direction such that the storage film assumes a same curvature when said slide is closed.

22. The storage film feed according to claim 1, wherein said passage gap has inner faces with a soft low-friction coating.

23. The storage film feed according to claim 22, wherein said passage gap has a clear width being greater than a thickness of the storage film and said inner faces have a minimum clearance of 0.3 mm from the storage film when the storage film is inserted.

24. A storage film scanner, comprising:
a storage film feed for feeding a storage film, said storage film feed containing:
a flexible sleeve open on one side on an end face into the storage film scanner;
a slide operating perpendicular to a flat side of said flexible sleeve; and
a stop piece associated with said slide, said stop piece and said slide together defining a feed opening formed there-between and a passage gap formed therein for the storage film, said stop piece and said slide disposed in said feed opening;
wherein said slide has an actuated position in which said slide exerts a compression force that fixes said flexible sleeve in said feed opening and in which said flat side of said flexible sleeve bears against said stop piece.

25. The storage film scanner according to claim 24,
further comprising a circling laser beam;
wherein said stop piece has slits formed therein that run parallel to a rotational axis of said circling laser beam and are provided for a tangential feed and ejection of the storage film.

* * * * *